(12) United States Patent
Sakurai

(10) Patent No.: US 7,978,397 B2
(45) Date of Patent: Jul. 12, 2011

(54) INFORMATION DISPLAY PANEL AND METHOD FOR MANUFACTURING THE SAME

(75) Inventor: Ryo Sakurai, Kokubunji (JP)

(73) Assignee: Bridgestone Corporation, Tokyo (JP)

( * ) Notice: Subject to any disclaimer, the term of this patent is extended or adjusted under 35 U.S.C. 154(b) by 543 days.

(21) Appl. No.: 11/915,536

(22) PCT Filed: May 23, 2006

(86) PCT No.: PCT/JP2006/310239
§ 371 (c)(1),
(2), (4) Date: Dec. 19, 2007

(87) PCT Pub. No.: WO2006/126533
PCT Pub. Date: Nov. 30, 2006

(65) Prior Publication Data
US 2008/0212164 A1    Sep. 4, 2008

(30) Foreign Application Priority Data

| May 25, 2005 | (JP) | 2005-151747 |
| Jun. 2, 2005 | (JP) | 2005-162168 |
| Jun. 2, 2005 | (JP) | 2005-162171 |

(51) Int. Cl.
*G02B 26/00* (2006.01)
*G09G 3/34* (2006.01)
(52) U.S. Cl. .......... 359/296; 345/107
(58) Field of Classification Search .......... 359/296; 345/107; 430/32; 204/600
See application file for complete search history.

(56) References Cited

U.S. PATENT DOCUMENTS 6,518,949 B2 * 2/2003 Drzaic .......... 345/107
2004/0263947 A1   12/2004 Drzaic et al.

FOREIGN PATENT DOCUMENTS

| JP | 2000-347225 A |   | 12/2000 |
| JP | 2000347225 A | * | 12/2000 |
| JP | 2001290178 A |   | 10/2001 |
| JP | 2003-131270 A |   | 5/2003 |
| JP | 2004-020758 A |   | 1/2004 |
| JP | 2004020758 A | * | 1/2004 |
| JP | 2004-37859 A |   | 2/2004 |
| JP | 2004-037859 A |   | 2/2004 |

OTHER PUBLICATIONS

Supplementary European Search Report dated Nov. 8, 2008 (6 pages).
European Search Report dated Nov. 27, 2009, 3 pages.

* cited by examiner

*Primary Examiner* — William C Choi
(74) *Attorney, Agent, or Firm* — Sughrue Mion, PLLC

(57) ABSTRACT

In an information display panel, in which display media are sealed between a transparent front substrate and a rear substrate, and, in which the display media, to which an electrostatic field is applied from electrodes arranged respectively to the front substrate and the rear substrate, are made to move so as to display information such as an image, the rear substrate is constituted by a flexible material, and a metal electrode is formed on the rear substrate by a patterning process using a vapor deposition and a sputtering or a metal electrode is formed on the rear substrate by effecting a patterning process to a metal film formed by a vapor deposition or a sputtering. In this manner, it is possible to obtain an information display panel, which can improve a flexibility of the rear substrate with the electrode by an inexpensive cost, achieve an easy handling of the substrate and decrease a panel breakage due to a detachment of two substrates.

8 Claims, 9 Drawing Sheets

FIG. 6
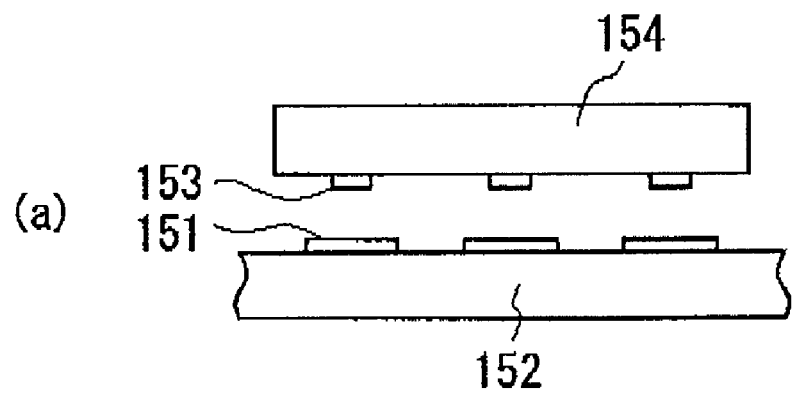
(a)
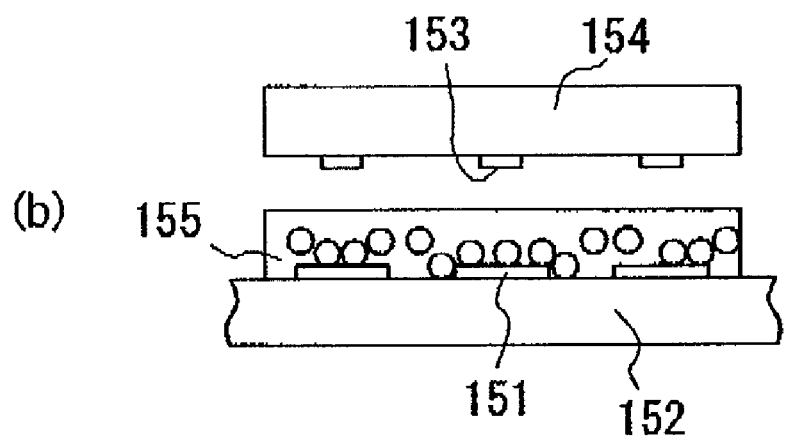
(b)
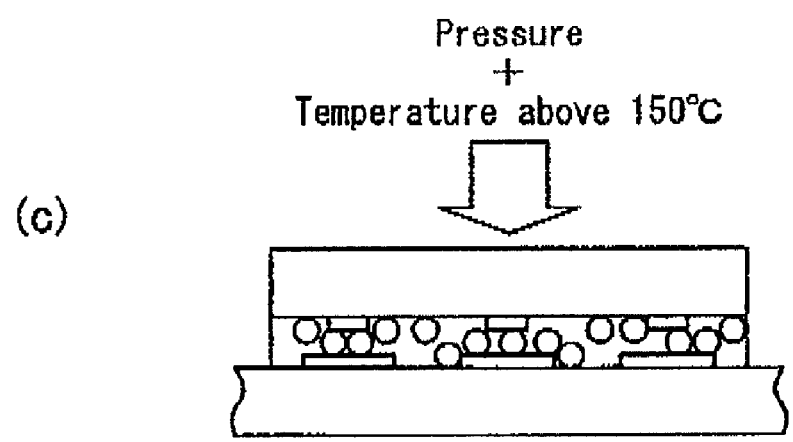
(c)

INFORMATION DISPLAY PANEL AND METHOD FOR MANUFACTURING THE SAME

TECHNICAL FIELD

The present invention relates to an information display panel, in which display media are sealed between a transparent front substrate and a rear substrate, and, in which the display media, to which an electrostatic field is applied from electrodes arranged respectively to the front substrate and the rear substrate, are made to move so as to display information such as an image, and a method of manufacturing the same.

RELATED ART

As an information display device substitutable for liquid crystal display (LCD), information display devices with the use of technology such as an electrophoresis method, an electro-chromic method, a thermal method, a dichroic-particles-rotary method and so on are proposed.

As for these information display devices, it is conceivable as inexpensive visual display device of the next generation from a merit having wide field of vision close to normal printed matter, having smaller consumption, or having a memory function, as compared with LCD, and spreading out to a display for portable device and an electronic paper is expected. Recently, electrophoresis method is proposed that microencapsulate dispersion liquid made up with dispersion particles and coloration solution and dispose the liquid between faced substrates, and also it is expected.

However, in the electrophoresis method, there is a problem that a response rate is slow by the reason of viscosity resistance because the particles migrate among the electrophoresis solution. Further, there is a problem of lacking imaging repetition stability, because particles with high specific gravity of titanium oxide is scattered within solution of low specific gravity, it is easy to subside, difficult to maintain a stability of dispersion state. Even in the case of microencapsulating, cell size is diminished to a microcapsule level in order to make it hard to appear, however, an essential problem was not overcome at all.

Besides the electrophoresis method using behavior in the solution, recently, a method wherein electro-conductive particles and a charge transport layer are installed in a part of the substrate without using solution is proposed. [The Imaging Society of Japan "Japan Hardcopy '99" (Jul. 21-23, 1999) Transaction Pages 249-252] However, there are some problems on this method: such that a construction becomes complicated since it is necessary to provide the charge transport layer, further a charge generation layer; and such that a display stability is deteriorated since it is difficult to constantly inject a charge in a conductive particle.

As one method for solving various problems mentioned above, there is known an information display panel, in which display media are sealed between a transparent front substrate and a rear substrate, and, in which the display media, to which an electrostatic field is applied from electrodes arranged respectively to the front substrate and the rear substrate, are made to move so as to display information such as an image.

In the information display panel mentioned above, the front substrate and the rear substrate are laminated by adhesives to make the panel under a condition such that the display media are arranged on the rear substrate or under a condition such that the display media are arranged on the rear substrate. Therefore, when the display media are arranged on the substrate or when the front substrate and the rear substrate are laminated by adhesives, it is necessary to handle the rear substrate. In this case, according to a condition of the rear substrate, there are drawbacks, such that a handling of the rear substrate is difficult since an electrode arranged to the substrate is peeled off, and such that the panel becomes easy to break since two substrates are detached due to a stress acting for the information display panel obtained by laminating two substrates by adhesives. Particularly, in the information display panel such as an electric paper, in which a display surface is sometimes bended, the above problems occur remarkably.

Usually, in the known information display panel, use is made of a glass as a substrate material and ITO (Indium Tin Oxide) as an electrode material. However, both of the glass material and the ITO material have a low flexibility, and thus they can't overcome the above problems. In addition, they are expensive and there is a drawback such that a cost of the information display panel becomes high.

DISCLOSURE OF THE INVENTION

The present invention has for its object to eliminate the drawbacks mentioned above and to provide an information display panel, which can improve a flexibility of the rear substrate with the electrode by an inexpensive cost, achieve an easy handling of the substrate and decrease a panel breakage due to a detachment of two substrates.

In order to achieve the above object, according to the invention, an information display panel, in which display media are sealed between a transparent front substrate and a rear substrate, and, in which the display media, to which an electrostatic field is applied from electrodes arranged respectively to the front substrate and the rear substrate, are made to move so as to display information such as an image, is characterized in that the rear substrate is constituted by a flexible material, and a metal electrode is formed on the rear substrate by a patterning process using a vapor deposition and a sputtering or a metal electrode is formed on the rear substrate by effecting a patterning process to a metal film formed by a vapor deposition or a sputtering.

The present invention has for its another object to provide an information display panel, which can be obtained inexpensively since the number of parts can be decreased, and take no trouble for manufacturing since the number of mounting processes can be decreased.

As a preferred embodiment for achieving the another object mentioned above, a chip of information display driver and so on is directly mounted on the rear substrate, in addition to a construction of the information display panel mentioned above.

As another preferred embodiment of the information display panel mentioned above, there are cases: such that a thickness of the metal electrode is 0.01-1 μm; such that a material of the metal electrode is aluminum; such that the flexible material constituting the rear substrate is a resin; and such that the resin is PET (Polyethylene Terephthalate) or PEN (Polyethylene Naphthalate).

According to the invention, since the rear substrate is constituted by a flexible material, and a metal electrode is formed on the rear substrate by a patterning process using a vapor deposition and a sputtering or a metal electrode is formed on the rear substrate by effecting a patterning process to a metal film formed by a vapor deposition or a sputtering, it is possible to obtain the information display panel, which can improve a flexibility of the rear substrate, achieve an easy handling of the substrate and decrease a panel breakage due to a detachment of two substrates. Moreover, a metal especially aluminum is an inexpensive electrode material, which can be formed by a vapor deposition or a sputtering, and a patterning process such as etching can be easily performed thereto. Further, if it is combined with the rear substrate made of a resin material especially PET or PEN, it is possible to obtain the flexible rear substrate in an extremely inexpensive manner. In this manner, according to the invention, it is possible to decrease a cost of the information display panel.

As a preferred embodiment for achieving the another object mentioned above, since the rear substrate is constituted by a flexible material, and a metal electrode is formed on the rear substrate by a patterning process using a vapor deposition and a sputtering or a metal electrode is formed on the rear substrate by effecting an etching process to a metal film formed by a vapor deposition or a sputtering, a flexibility of the substrate and the electrode required for mounting the chip can be obtained, and thus a chip of information display driver and so on can be directly mounted on the rear substrate. As a result, it is possible to obtain an information display panel, which can be obtained inexpensively since the number of parts can be decreased, and take no trouble for manufacturing since the number of mounting processes can be decreased.

The present invention has for its further another object to provide an information display panel, in which the chip of information display driver and so on can be directly mounted on the substrate even in the case of using an inexpensive substrate having a low heat resistance.

In order to achieve the further another object mentioned above, according to the invention, a method of manufacturing the information display panel, in which display media are sealed between a transparent front substrate and a rear substrate, and, in which the display media, to which an electrostatic field is applied from electrodes arranged respectively to the front substrate and the rear substrate, are made to move so as to display information such as an image, characterized in that, when the chip of information display driver and so on is directly mounted on the rear substrate, the chip and the metal electrode formed on the rear substrate are directly connected by applying an ultrasonic wave and a pressure thereto through a wiring extended from the metal electrode.

As a preferred embodiment of the method of manufacturing the information display panel according to the invention, there are cases: such that the rear substrate is constituted by the flexible material, the metal electrode and the wiring extended from the metal electrode are arranged on the rear substrate by patterning a metal material by means of a vapor deposition or a sputtering or by forming a metal film by vapor-depositing or sputtering a metal material and pattering the metal film, and an ultrasonic wave and a pressure are applied under a condition such that a terminal of the chip is contacted to the wiring extended from the metal electrode so as to mount the chip; such that a wiring for connecting the chip of image display driver and so on and the image display driver and so on is arranged on the rear substrate, together with the metal electrode and the wiring extended from the metal electrode, by patterning a metal material by means of a vapor deposition or a sputtering or by forming a metal film by vapor-depositing or sputtering a metal material and pattering the metal film, and an ultrasonic wave and a pressure are applied under a condition such that a terminal of the chip corresponding respectively to the wiring extended from the metal electrode and the wiring for connecting the chip and the information display drivers and so on so as to mount the chip; such that a thickness of the wiring for connecting the metal electrode, the wiring extended from the metal electrode and the chip of image display driver and so on and the image display driver and so on is in a range of 0.01-1 µm; such that a thickness of all the wirings for connecting the metal electrode, the wiring extended from the metal electrode and the chip of image display driver and so on and the image display driver and so on is same; such that a material of the wiring for connecting the metal electrode, the wiring extended from the metal electrode and the chip of image display driver and so on and the image display driver and so on is aluminum; such that the flexible material constituting the rear substrate is a resin; and such that the resin is PET (Polyethylene Terephthalate) or PEN (Polyethylene Naphthalate).

According to the method of manufacturing the information display panel of the invention, when the chip of information display driver and so on is directly mounted on the rear substrate, the chip and the metal electrode formed on the rear substrate are directly connected by applying an ultrasonic wave and a pressure thereto through a wiring extended from the metal electrode. Therefore, a connection due to a metal eutectic crystal by means of an ultrasonic wave can be performed between the wiring and the terminal, and thus it is possible to obtain the information display panel and the method of manufacturing the information display panel, in which the chip of information display driver and so on can be directly mounted on the substrate even in the case of using the inexpensive substrate having a low heat resistance.

BRIEF DESCRIPTION OF THE DRAWINGS

FIGS. 6a to 6c are schematic views respectively explaining respective processes in the known method of manufacturing the information display panel.

BEST MODE FOR CARRYING OUT THE INVENTION

At first, a basic construction of an information display panel using the display media constituted by the particles for display media according to the invention will be explained. In the information display panel using the particles according to the invention, an electrostatic field is applied to the display media sealed between opposed two substrates. Along a direction of the applied electrostatic field, charged display media are attracted by means of a force due to electrostatic field or Coulomb's force, and, the display media are moved reciprocally by varying a direction of the electrostatic field due to a potential switching, so that information such as an image can be displayed. Therefore, it is necessary to design the information display panel in such a manner that the display media can move evenly and maintain stability during a reciprocal operation or during a display information reserving state. Here, as to forces applied to the particles constituting the display media, there are an attraction force between the particles due to Coulomb' force, an imaging force with respect to the electrode or the substrate, an intermolecular force, a liquid bonding force and a gravity.

Examples of the information display panel according to the invention will be explained with reference to FIGS. 1a, 1b, FIG. 2 and FIGS. 3a, 3b.

Figure 1:
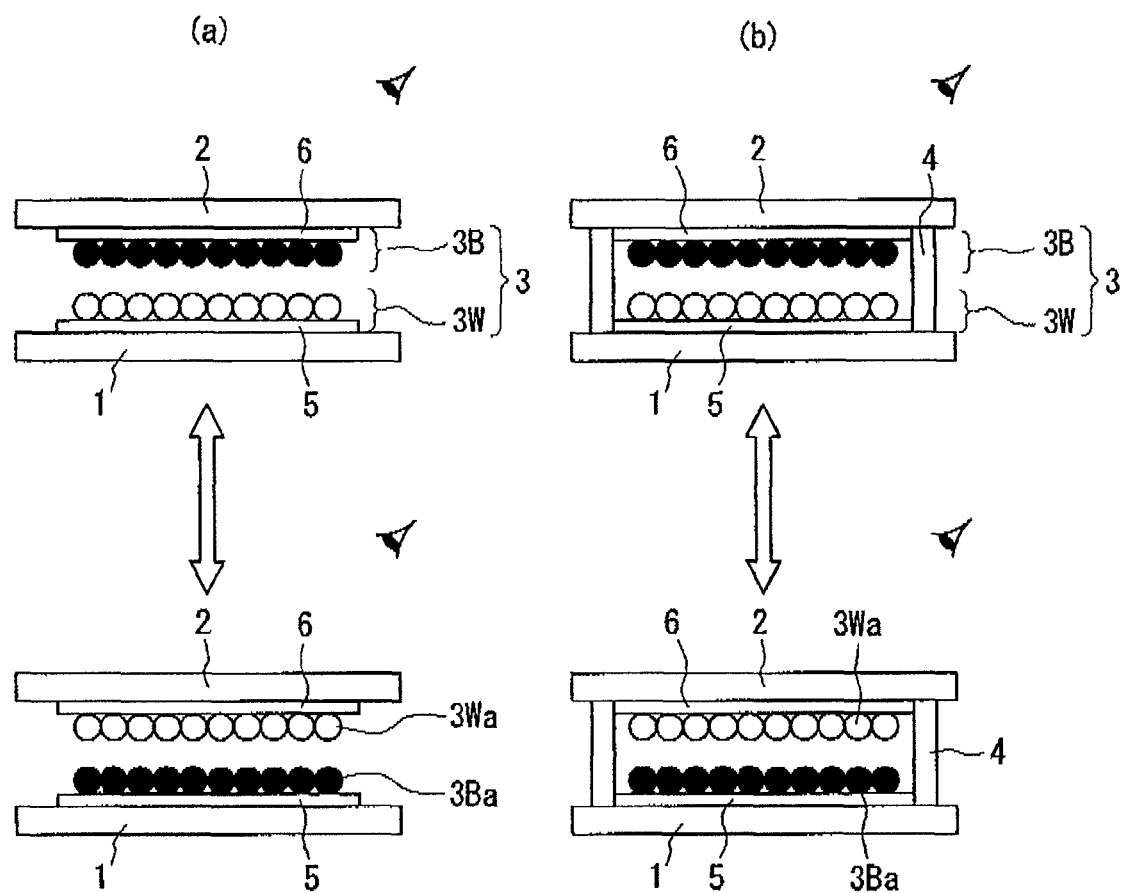
FIGS. 1a and 1b are schematic views respectively showing one embodiment of the information display panel according to the invention.
Figure 2:
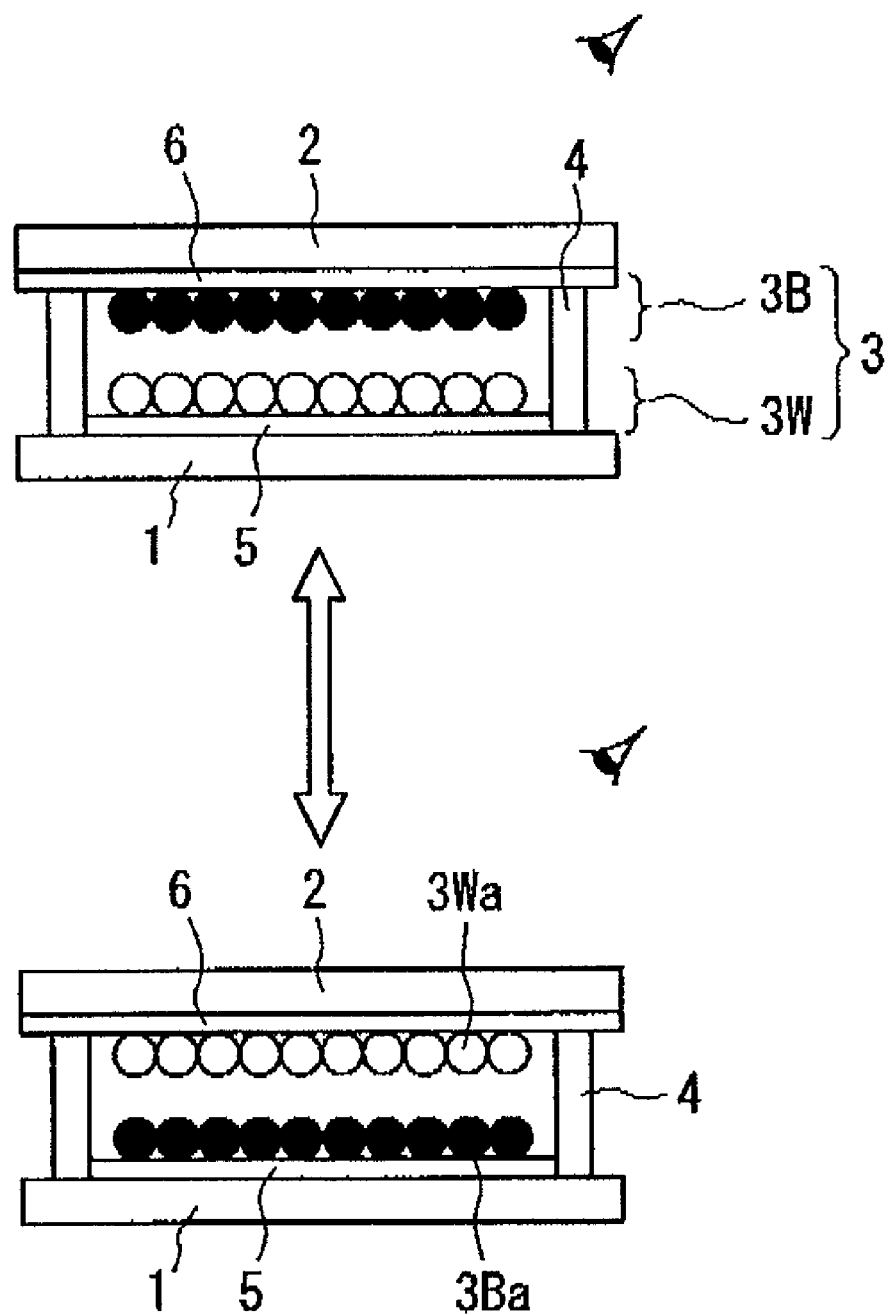
FIG. 2 is a schematic view illustrating another embodiment of the information display panel according to the invention.

In the example shown in FIGS. 1a and 1b, at least two or more groups of display media having different optical reflectance and different charge characteristics and comprising at least one or more groups of particles (here, white color display media 3W constituted by the particles and black color display media 3B constituted by the particles are shown) are sealed between the substrate 1 and the substrate 2 and moved in a perpendicular direction with respect to substrates 1 and 2, in accordance with an electric field generated by applying a voltage between an electrode 5 arranged to the substrate 1 and an electrode 6 arranged to the substrate 2, so as to display a black color by viewing the black color display media 3B to an observer or so as to display a white color by viewing the white color display media 3W to the observer. In the example shown in FIG. 1b, a cell is formed by arranging for example grid-like partition walls 4 between the substrates 1 and 2 (in FIG. 1, the partition walls arranged at the near side are omitted). Moreover, FIGS. 1a and 1b show an example of a discrete electrode, and FIG. 2 illustrates an example of a line electrode. Further, the electrode may be arranged outside of the substrate and may be embedded in the substrate.

Figure 3:
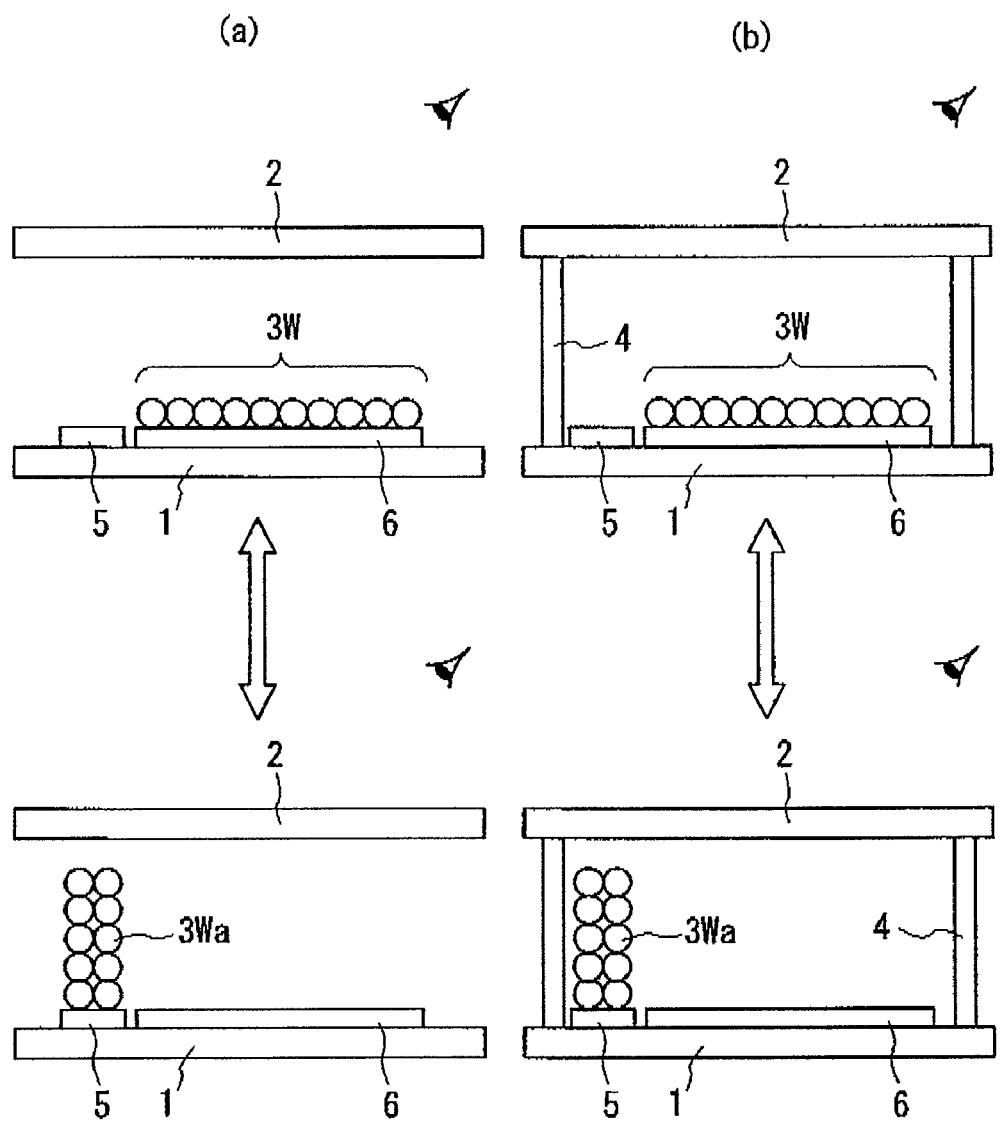
FIGS. 3a and 3b are schematic views respectively depicting still another embodiment of the information display panel according to the invention.

In the example shown in FIGS. 3a and 3b, one group of display media having one color and one charge characteristic and comprising at least one or more groups of particles (here, white color display media 3W constituted by the particles are shown) is moved in a parallel direction with respect to substrates 1 and 2, in accordance with an electric field generated by applying a voltage between the electrode 5 arranged to the substrate 1 and the electrode 6 arranged to the substrate 1, so as to display a white color by viewing the white color display media 3W to an observer or so as to display a color of the electrode 6 or the substrate 1 by viewing a color of the electrode 6 or the substrate 1 to the observer. In the example shown in FIG. 3b, a cell is formed by arranging for example grid-like partition walls 4 between the substrates 1 and 2 (in FIG. 3, the partition walls arranged at the near side are omitted).

The above explanations can be applied to a case such that the white color particles 3W are substituted by white color liquid powders or a case such that the black color particles 3B are substituted by black color liquid powders.

<Explanation of the Information Display Panel According to the Main Invention>

Features of the invention, in the information display panel using the display media mentioned above, are that the rear substrate (corresponding to the substrate 1, hereinafter, sometimes denoted by a numeral 1) is constituted by a flexible material, and a metal electrode is formed on the rear substrate by a patterning process using a vapor deposition and a sputtering or a metal electrode (corresponding to the electrode 5 in FIG. 1 and FIG. 2 or to the electrodes 5 and 6 in FIG. 3, hereinafter, sometimes denoted by a numeral 5) is formed on the rear substrate by effecting a patterning process to a metal film formed by a vapor deposition or a sputtering. When directly patterning a shape of the electrode (line shape), it is conceivable to use a mask during a sputtering process.

More specifically, it is preferred that a thickness of the metal electrode 5 is 0.01-1 μm. Here, the reason, that a thickness of the metal electrode 5 is preferably 0.01-1 μm, is as follows. If it is less than 0.01 μm, it is difficult to make even a thickness of the electrode on the substrate, and thus a resistance on the substrate becomes uneven. This leads to an electrode breakage and a display unevenness. On the other hand, if a thickness of the electrode 5 exceeds 1 μm, the particles for display media are sandwiched between the patterned electrodes arranged respectively on the substrates, and thus they can't move. This leads to a deterioration of the display state. Moreover, it is preferred that a material of the metal electrode is aluminum, or that the flexible material constituting the rear substrate is a resin, or that the resin is PET (Polyethylene Terephthalate) or PEN (Polyethylene Naphthalate), since it is effective to achieve the flexible rear substrate 1, to which the electrode 5 is arranged, according to the invention.

<Explanation of the Preferred Embodiment of the Information Display Panel According to the Invention>

Figure 4:
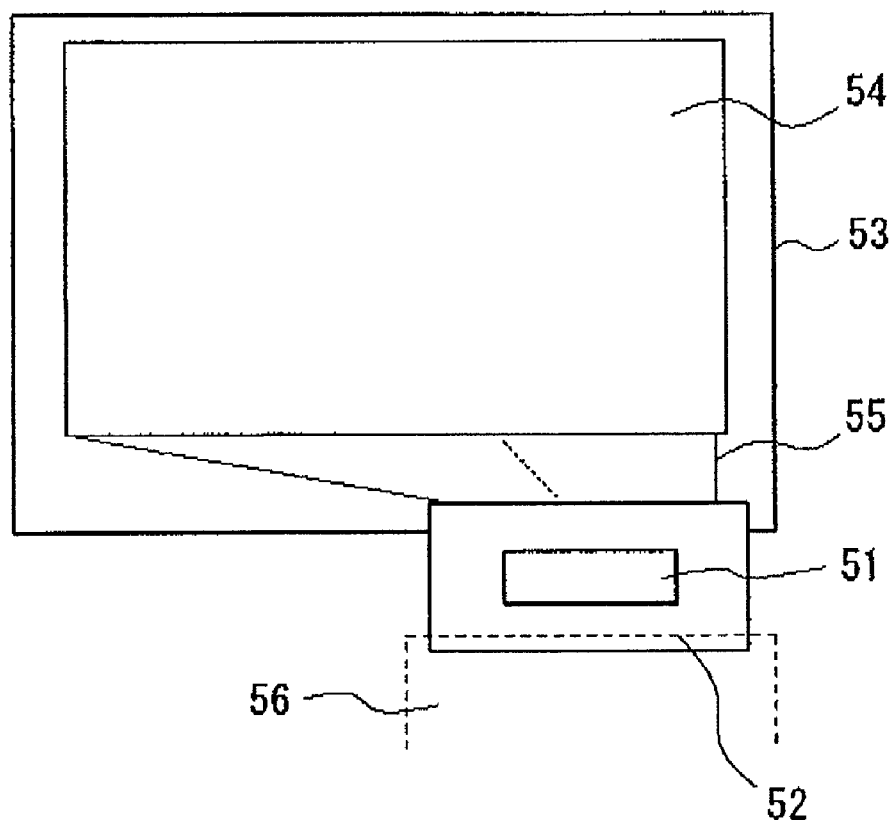
FIG. 4 is a schematic view explaining one embodiment of a chip mounting in the known information display panel.

In the information display panel mentioned above, in order to display information such as an image, it is necessary to use the chip of information display driver and so on for supplying a drive signal to the electrodes arranged respectively to the front substrate and the rear substrate. Usually, such a chip is often mounted to the information display panel. In this case, the usual chip mounting is performed, as shown in FIG. 4 as one example, in such a manner that a chip 51 constituting the information display driver is mounted on a polyimide substrate 52, TCP (Tape Carrier Package) or COF (Chip On Film) is manufactured, and the manufactured TCP or COF is mounted on a rear substrate 53. In addition, a numeral 54 is an information display portion to which the electrode is arranged, a numeral 55 is a wiring for connecting the electrode and TCP and so on, and a numeral 56 is a connector for connecting TCP and so on to the external circuit.

Therefore, in the known information display panel, since it is necessary to use TCP or COF and so on to mount the chip 51 of information display driver and thus the number of parts is increased, there is a drawback such that the information display panel becomes expensive. In addition, since the mounting process for TCP and so on is necessary and the number of the mounting processes becomes large, there is a drawback such that the manufacturing of the information display panel is troublesome.

In order to solve these problems mentioned above, the features of the preferred embodiments of the invention, in the information display panel using the display media and having the construction mentioned above, are that the rear substrate (corresponding to the substrate 1, hereinafter, sometimes denoted by a numeral 1) is constituted by a flexible material, and a metal electrode is formed on the rear substrate by a patterning process using a vapor deposition and a sputtering or a metal electrode (corresponding to the electrode 5, hereinafter, sometimes denoted by a numeral 5) is formed on the rear substrate by effecting a patterning process to a metal film formed by a vapor deposition or a sputtering, and further that a chip of information display driver and so on is directly mounted on the rear substrate 1.

Figure 5:
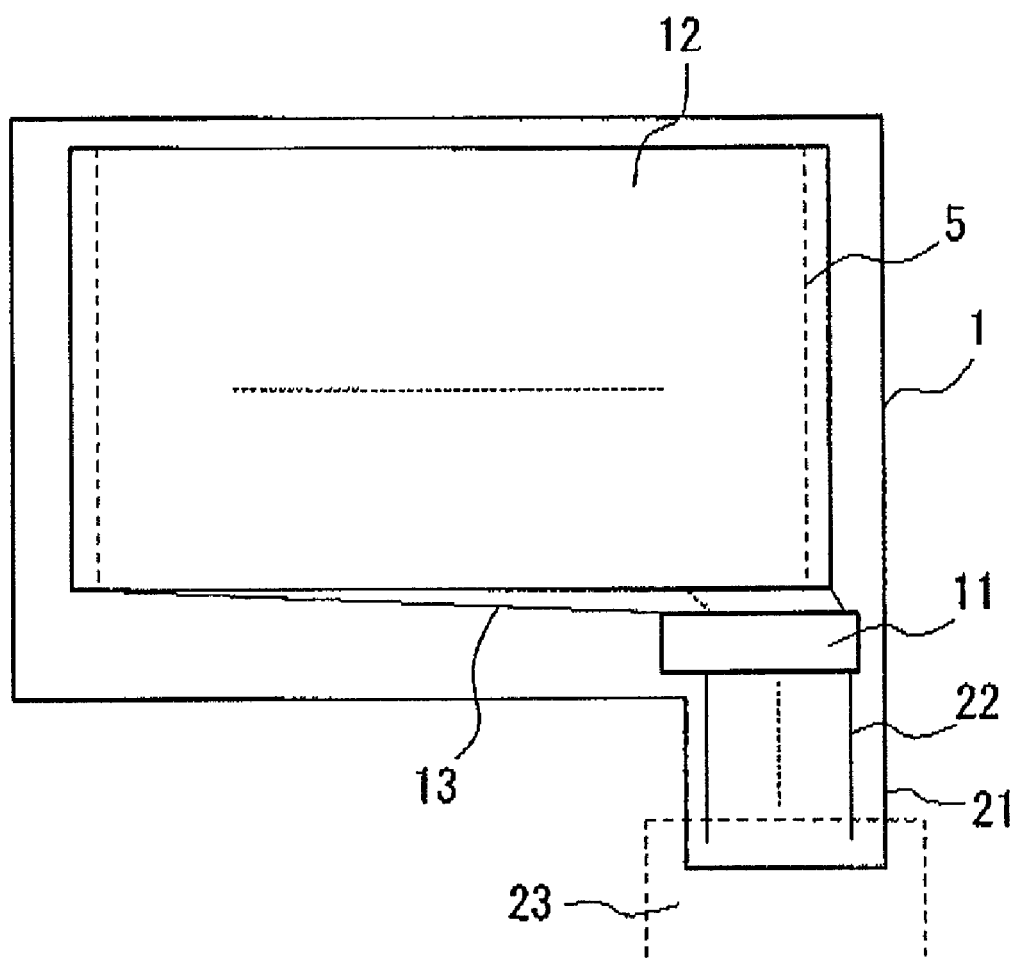
FIG. 5 is a schematic view explaining one embodiment of a chip mounting in the information display panel according to the invention.

FIG. 5 is a schematic view explaining one embodiment of a chip mounting in the information display panel according to the invention. In the embodiment shown in FIG. 5, the rear substrate 1 is constituted by a flexible material, and a metal electrode is formed on the rear substrate by a patterning process using a vapor deposition and a sputtering or a metal electrode 5 is formed on the rear substrate by effecting a patterning process to a metal film formed by a vapor deposition or a sputtering. In addition, the direct mounting of a chip 11 is performed in such a manner that a connection terminal of the chip 11 of information display driver and so on is directly connected to a wiring 13 formed on the rear substrate 1 corresponding respectively to a metal electrode 5 arranged to an information display portion 12 of the rear substrate 1.

In the embodiment mentioned above, the rear substrate 1 includes a wiring for inputting a signal to the chip 11 of the information display driver. That is, a projection portion 21 is arranged to the rear substrate 1 corresponding to a portion to which the chip 11 is mounted. In addition, a wiring 22 toward the chip 11 is formed on the projection portion 21, and the wiring 22 is connected to a connector 23, thereby performing a connection with the external circuit. Moreover, the chip 11 and the wiring 13 are connected, and a connection by means of an ultrasonic wave is performed when the chip 11 is mounted on the rear substrate 1. That is, a connection between the chip 11 and the wiring 13 and a connection between the chip 11 and the wiring 22 are performed by setting the chip 11 on the wiring 13 and the wiring 22 and applying an ultrasonic wave to the chip 11 under a chip pressing state. In both cases, it is possible to obtain the information display panel according to the invention more preferably.

In the embodiment mentioned above, the metal electrode 5, the wiring 13 and the wiring 22, which are arranged on the rear substrate 1, may be formed simultaneously on the rear substrate 1 by vapor-depositing or sputtering the metal film, or, may be formed simultaneously by performing an etching process after the metal film is formed on the rear substrate 1 by means of a vapor deposition or a sputtering.

More specifically, it is preferred that a thickness of the metal electrode 5 is 0.01-1 µm. Here, the reason, that a thickness of the metal electrode 5 is preferably 0.01-1 µm, is as follows. If it is less than 0.01 µm, it is difficult to make even a thickness of the electrode on the substrate, and thus a resistance on the substrate becomes uneven. This leads to an electrode breakage and a display unevenness. On the other hand, if a thickness of the electrode 5 exceeds 1 µm, the particles for display media are sandwiched between the patterned electrodes arranged respectively on the substrates, and thus they can't move. This leads to a deterioration of the display state. Moreover, it is preferred that a material of the metal electrode is aluminum, or that the flexible material constituting the rear substrate is a resin, or that the resin is PET (Polyethylene Terephthalate) or PEN (Polyethylene Naphthalate), since it is effective to achieve the flexible rear substrate 1, to which the electrode 5 is arranged, according to the invention.

<Explanation of the Method of Manufacturing the Information Display Panel According to the Invention>

In the information display panel mentioned above, in order to display information such as an image, it is necessary to use the chip of information display driver and so on for supplying a drive signal to the electrodes arranged respectively to the front substrate and the rear substrate. In this case, the usual chip mounting is performed by a thermal compression bond using ACF (Anisotropically Conductive Film) when for example the chip is directly mounted on the rear substrate.

That is, as shown in FIGS. 6a-6c as one example, a chip 154 is connected on a rear substrate 152 by preparing the rear substrate 152 having a wiring 151 extended from the electrode for image display and the chip 154 having a terminal 153 corresponding to the wiring 151 (FIG. 6a), preliminarily bonding ACF 155 to a portion on the rear substrate 152 corresponding to the chip 154 (FIG. 6b), and performing a thermal compression bond between the rear substrate 152 and the chip 154 under a temperature for example above 150° C. (FIG. 6c).

Therefore, in the direct mounting of the chip 154 in the known information display panel, since it is necessary to use ACF 155, there is a drawback such that the substrate made of inexpensive material such as resin having a low heat resistance is not used for the rear substrate 152 to which the chip 154 is mounted.

The features of the invention are that, when the chip of information display driver and so on is directly mounted on the rear substrate 1, the chip and the metal electrode 5 formed on the rear substrate 1 are directly connected by applying an ultrasonic wave and a pressure thereto through a wiring extended from the metal electrode, or more specifically that: the rear substrate is constituted by the flexible material; the metal electrode and the wiring extended from the metal electrode are arranged on the rear substrate by patterning a metal material by means of a vapor deposition or a sputtering or by forming a metal film by vapor-depositing or sputtering a metal material and pattering the metal film; and an ultrasonic wave and a pressure are applied under a condition such that a terminal of the chip is contacted to the wiring extended from the metal electrode so as to mount the chip.

Figure 7:
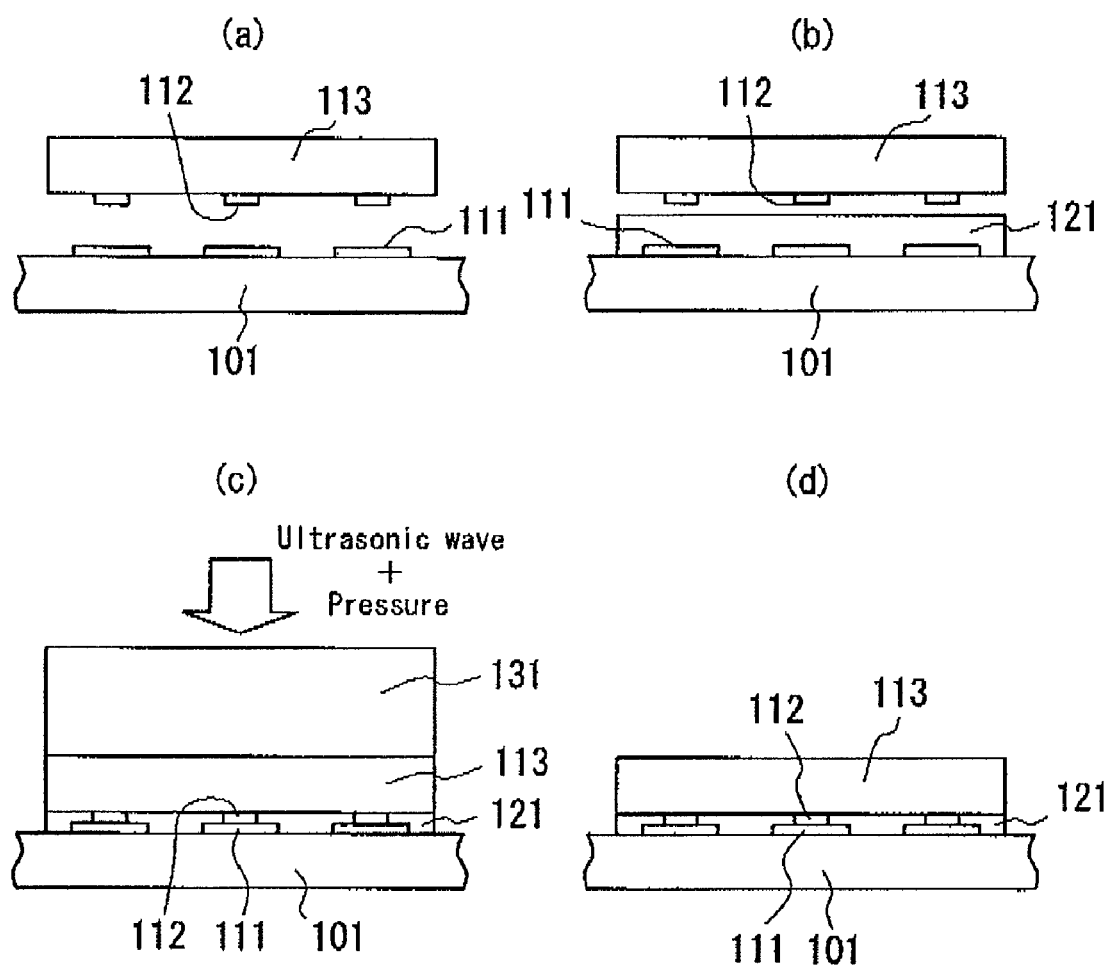
FIGS. 7a to 7d are schematic views respectively explaining respective processes in the method of manufacturing the information display panel according to the invention.

FIGS. 7a to 7d are schematic views respectively explaining respective processes in the method of manufacturing the information display panel according to the invention. In the embodiment shown in FIGS. 7a to 7d, firstly as shown in FIG. 7a, a rear substrate 101 having a wiring 111 extended from the electrode 5 for image display (here not shown) and a chip 113 of information display driver and so on having a terminal 112 made of gold and so on corresponding to the wiring 111 are prepared.

As a specific embodiment of a connection wiring between the image display driver and so on, and the rear substrate 101, the metal electrode, the wiring extended from the metal electrode and the chip, it is preferred that a thickness of the metal electrode 5 is 0.01-1 µm. Here, the reason, that a thickness of the metal electrode 5 is preferably 0.01-1 µm, is as follows. If it is less than 0.01 µm, it is difficult to make even a thickness of the electrode on the substrate, and thus a resistance on the substrate becomes uneven. This leads to an electrode breakage and a display unevenness. On the other hand, if a thickness of the electrode 5 exceeds 1 µm, the particles for display media are sandwiched between the patterned electrodes arranged respectively on the substrates, and thus they can't move. This leads to a deterioration of the display state. Moreover, it is preferred that a thickness of the connection wiring between the information display driver and so on, and the wiring extended from the metal electrode and the chip is 0.01-1 µm. Here, the reason, that it is preferred that a thickness of the connection wiring between the information display driver and so on, and the wiring extended from the metal electrode and the chip is 0.01-1 µm, is as follows. If it is less than 0.01 µm, a connection due to eutectic crystal between the electrode wiring and the chip connection terminal and a connection due to eutectic crystal between the connection wiring and the chip connection terminal are insufficient. In addition, even if it exceeds 1 µm, there is no particular trouble. However, in the case of manufacturing simultaneously these wirings together with the metal electrode, since it is easy to make even a thickness of the wirings and a thickness of the electrode, a thickness is controlled to be not greater than 1 µm, which is inconvenient for the electrode.

Moreover, in the embodiment mentioned above, since the wiring 111 is constructed on the same rear substrate 101 in such a manner that it extends from the metal electrode 5 and further the connection wiring between the chip and the information display driver and so on is constructed on the same rear substrate 101, the connection wiring between: the wiring 111 and the chip; and the information display driver and so on; can be formed simultaneously with the formation of the metal electrode 5 on the rear substrate 101 by means of a vapor deposition and the sputtering. In this case, it is easy and preferable that thickness of the three members is made even. Moreover, it is preferred that a material of the wiring for connecting the metal electrode, the wiring extended from the metal electrode and the chip of information display driver and so on, and the information display driver and so on is aluminum, that a flexible material constituting the rear substrate is a resin, and that the resin is PET (Polyethylene Terephthalate) or PEN (Polyethylene Naphthalate). These features are effective for directly mounting the chip of information display driver and so on according to the invention to the rear substrate 101, and they are preferable embodiments.

Then, as shown in FIG. 7b, an under-fill agent 121 is applied to a portion on the rear substrate 101 corresponding to the chip 113 and the under-fill agent 121 is aligned with respect to the chip 113. Then, as shown in FIG. 7c, an ultrasonic wave head 131 is arranged to the chip 113 and predetermined ultrasonic wave and pressure are applied to the chip 113 from the ultrasonic wave head 131, so that a terminal 112 of the chip 113 is pressure-bonded to a wiring 111 of the rear substrate 101. In this manner, as shown in FIG. 7b, the terminal 112 of the chip 113 and the wiring 111 of the rear substrate 101 are connected through the under-fill agent 112 to mount the chip 113.

Hereinafter, respective members constituting the information display panel according to the invention will be explained.

As the substrate, at least one of the substrates is the transparent substrate through which a color of the display media can be observed from outside of the panel, and it is preferred to use a material having a high transmission factor of visible light and an excellent heat resistance. The other substrate may be transparent or may be opaque. Examples of the substrate material include polymer sheets such as polyethylene terephthalate, polyethylene naphthalate, polyether sulfone, polyethylene, polycarbonate, polyimide or acryl and metal sheets having flexibility and inorganic sheets such as glass, quartz or so having no flexibility. The thickness of the substrate is preferably 2 to 5000 μm, more preferably 5 to 2000 μm. When the thickness is too thin, it becomes difficult to maintain strength and distance uniformity between the substrates, and when the thickness is thicker than 5000 μm, there is a drawback as a thin-type information display panel.

As a material of the electrode arranged to the rear substrate in the information display panel, use is made of metals such as aluminum, silver, nickel, copper, gold. In this invention, it is preferred to use aluminum. As an electrode forming method, use is made of a method such that the metal electrode is formed by a patterning process using a sputtering method, a vapor deposition method, or CVD (chemical vapor deposition) method, or a method such that the metal electrode is formed by effecting a patterning process such as etching to a metal film formed by a sputtering method, a vapor deposition method or CVD (chemical vapor deposition) method.

As a material of the electrode arranged to the transparent front substrate at a display surface side, use is made of conductive metal oxides such as indium tin oxide (ITO), antimony tin oxide (ATO), indium oxide, conductive tin oxide, conductive zinc oxide and so on, or, conductive polymers such as polyaniline, polypyrrole, polythiophene and so on, and they are used by being suitably selected. As an electrode forming method, use is made of a method in which the materials mentioned above are made to a thin film by means of sputtering method, vacuum vapor deposition method, CVD (chemical vapor deposition) method, coating method and so on, or, a method in which conductive materials and solvents are mixed with synthetic resin binder and the mixture is sprayed to perform pattering. In both cases, the materials mentioned above, which are transparent and have a pattern formation capability, can be suitably used. Additionally, the thickness of the electrode may be suitable unless the electroconductivity is absent or any hindrance exists in optical transparency, and it is preferable to be 3 to 1000 nm, more preferable to be 5 to 400 nm. The thickness of the electrode arranged to the rear substrate 1 is preferably 0.01-1 μm, if a conductivity is maintained and an adhesion and a flexibility with respect to the substrate is not affected. In this case, the applied outer voltage may be superimposed with a direct current or an alternate current.

Figure 8:
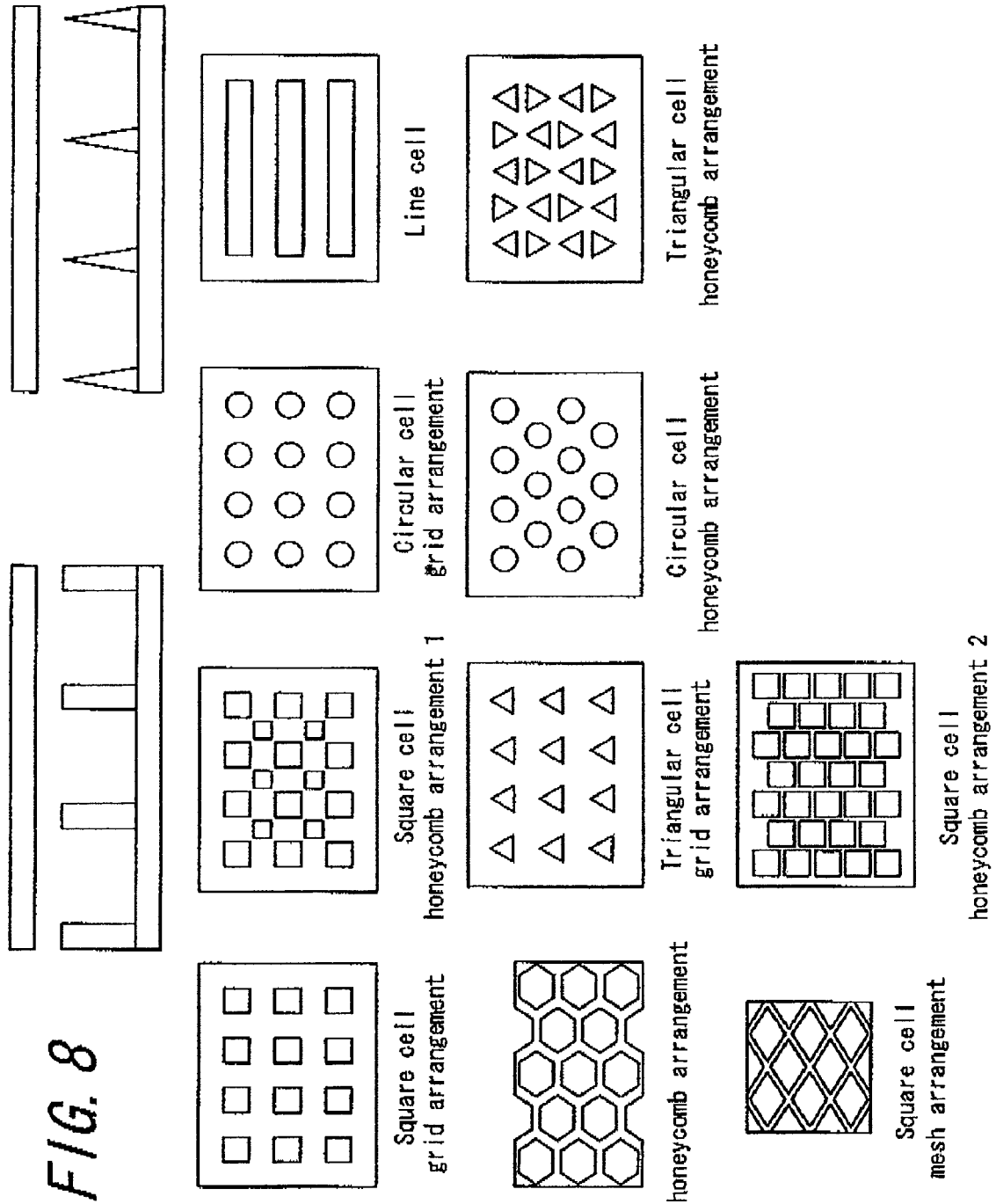
FIG. 8 is a schematic view showing one embodiment of partition shapes in the information display panel according to the invention.

A height and a shape of the partition wall arranged to the substrate are suitably designed in accordance with a kind of the display media used for the display and is not restricted. However, it is preferred to set a width of the partition wall to 2-100 μm more preferably 3-50 μm and to set a height of the partition wall to 10-500 μm more preferably 10-200 μm. The cell formed by the partition walls each made of rib has a square shape, a triangular shape, a line shape, a circular shape and a hexagon shape, and has an arrangement such as a grid, a honeycomb and a mesh, as shown in FIG. 8 viewed from a plane surface of the substrate. It is preferred that the portion corresponding to a cross section of the partition wall observed from the display side (an area of the frame portion of the cell) should be made as small as possible. In this case, a clearness of the image display can be improved.

Then, liquid powders used for example as display media in the information display panel according to the invention will be explained. It should be noted that a right of the name of liquid powders used in the information display panel according to the invention is granted to the applicant as "Electric liquid powders" (Registered): register No. 4636931 in Japan.

In the present invention, a term "liquid powders" means an intermediate material having both of liquid properties and particle properties and exhibiting a self-fluidity without utilizing gas force and liquid force. Preferably, it is a material having an excellent fluidity such that there is no repose angle defining a fluidity of powder. For example, a liquid crystal is defined as an intermediate phase between a liquid and a solid, and has a fluidity showing a liquid characteristic and an anisotropy (optical property) showing a solid characteristic (Heibonsha Ltd.: encyclopedia). On the other hand, a definition of the particle is a material having a finite mass if it is vanishingly small and receives an attraction of gravity (Maruzen Co., Ltd.: physics subject-book). Here, even in the particles, there are special states such as gas-solid fluidized body and liquid-solid fluidized body. If a gas is flown from a bottom plate to the particles, an upper force is acted with respect to the particles in response to a gas speed. In this case, the gas-solid fluidized body means a state that is easily fluidized when the upper force is balanced with the gravity. In the same manner, the liquid-solid fluidized body means a state that is fluidized by a liquid. (Heibonsha Ltd.: encyclopedia) In the present invention, it is found that the intermediate material having both of fluid properties and solid properties and exhibiting a self-fluidity without utilizing gas force and liquid force can be produced specifically, and this is defined as the liquid powders.

That is, as is the same as the definition of the liquid crystal (intermediate phase between a liquid and a solid), the liquid powders according to the invention are a material showing the intermediate state having both of liquid properties and particle properties, which is extremely difficult to receive an influence of the gravity showing the particle properties mentioned above and indicates a high fluidity. Such a material can be obtained in an aerosol state i.e. in a dispersion system wherein a solid-like or a liquid-like material is floating in a relatively stable manner as a dispersant in a gas, and thus, in the information display device according to the invention, a solid material is used as a dispersant.

The information display panel has a construction such that the liquid powders composed of a solid material stably floating as a dispersoid in a gas and exhibiting a high fluidity in an aerosol state are sealed between opposed two substrates, wherein one of two substrates is transparent. Such liquid powders can be made to move easily and stably by means of Coulomb's force and so on generated by applying a low voltage.

As mentioned above, the liquid powders means an intermediate material having both of liquid properties and particle properties and exhibiting a self-fluidity without utilizing gas force and liquid force. Such liquid powders become particularly an aerosol state. In the information display device according to the invention, the liquid powders used in a state such that a solid material is relatively and stably floating as a dispersoid in a gas.

Then, the particles for the display media (hereinafter, called sometimes as particles) constituting the display media used in the information display panel according to the invention will be explained. The particles for the display media may be used as the display media constituted by the particles only, or, as the display media constituted by mixing various groups of the particles, or, as the display media constituted by the liquid powders obtained by controlling and mixing the particles. The particle may be composed of resins as a main ingredient, and can include according to need charge control agents, coloring agent, inorganic additives and so on as is the same as the known one. Hereinafter, typical examples of resin, charge control agent, coloring agent, additive and so on will be explained.

Typical examples of the resin include urethane resin, urea resin, acrylic resin, polyester resin, acryl urethane resin, acryl urethane silicone resin, acryl urethane fluorocarbon polymers, acryl fluorocarbon polymers, silicone resin, acryl silicone resin, epoxy resin, polystyrene resin, styrene acrylic resin, polyolefin resin, butyral resin, vinylidene chloride resin, melamine resin, phenolic resin, fluorocarbon polymers, polycarbonate resin, polysulfon resin, polyether resin, and polyamide resin. Two kinds or more of these may be mixed and used. For the purpose of controlling the attaching force with the substrate, acryl urethane resin, acryl silicone resin, acryl fluorocarbon polymers, acryl urethane silicone resin, acryl urethane fluorocarbon polymers, fluorocarbon polymers, silicone resin are particularly preferable.

Examples of the electric charge control agent include, but not particularly specified to, negative charge control agent such as salicylic acid metal complex, metal containing azo dye, oil-soluble dye of metal-containing (containing a metal ion or a metal atom), the fourth grade ammonium salt-based compound, calixarene compound, boron-containing compound (benzyl acid boron complex), and nitroimidazole derivative. Examples of the positive charge control agent include nigrosine dye, triphenylmethane compound, the fourth grade ammonium salt compound, polyamine resin, imidazole derivatives, etc. Additionally, metal oxides such as ultra-fine particles of silica, ultra-fine particles of titanium oxide, ultra-fine particles of alumina, and so on; nitrogen-containing circular compound such as pyridine, and so on, and these derivates or salts; and resins containing various organic pigments, fluorine, chlorine, nitrogen, etc. can be employed as the electric charge control agent.

As for a coloring agent, various kinds and colors of organic or inorganic pigments or dye as will be described below are employable.

Examples of black pigments include carbon black, copper oxide, manganese dioxide, aniline black, and activate carbon.

Examples of blue pigments include C.I. pigment blue 15:3, C.I. pigment blue 15, Berlin blue, cobalt blue, alkali blue lake, Victoria blue lake, phthalocyanine blue, metal-free phthalocyanine blue, partially chlorinated phthalocyanine blue, first sky blue, and Indanthrene blue BC.

Examples of red pigments include red oxide, cadmium red, diachylon, mercury sulfide, cadmium, permanent red 4R, lithol red, pyrazolone red, watching red, calcium salt, lake red D, brilliant carmine 6B, eosin lake, rhodamine lake B, alizarin lake, brilliant carmine 3B, and C.I. pigment red 2.

Examples of yellow pigments include chrome yellow, zinc chromate, cadmium yellow, yellow iron oxide, mineral first yellow, nickel titanium yellow, navel orange yellow, naphthol yellow S, hansayellow G, hansayellow 10G, benzidine yellow G, benzidine yellow GR, quinoline yellow lake, permanent yellow NCG, tartrazinelake, and C.I. pigment yellow 12.

Examples of green pigments include chrome green, chromium oxide, pigment green B, C.I. pigment green 7, Malachite green lake, and final yellow green G.

Examples of orange pigments include red chrome yellow, molybdenum orange, permanent orange GTR, pyrazolone orange, Balkan orange, Indanthrene brilliant orange RK, benzidine orange G, Indanthrene brilliant orange GK, and C.I. pigment orange 31.

Examples of purple pigments include manganese purple, first violet B, and methyl violet lake.

Examples of white pigments include zinc white, titanium oxide, antimony white, and zinc sulphide.

Examples of extenders include baryta powder, barium carbonate, clay, silica, white carbon, talc, and alumina white. Furthermore, there are Nigrosine, Methylene Blue, rose bengal, quinoline yellow, and ultramarine blue as various dyes such as basic dye, acidic dye, dispersion dye, direct dye, etc.

Examples of inorganic additives include titanium oxide, zinc white, zinc sulphide, antimony oxide, calcium carbonate, pearl white, talc, silica, calcium silicate, alumina white, cadmium yellow, cadmium red, titanium yellow, Pressian blue, Armenian blue, cobalt blue, cobalt green, cobalt violet, ion oxide, carbon black, manganese ferrite black, cobalt ferrite black, copper powder, aluminum powder.

These coloring agents and inorganic additives may be used alone or in combination of two or more kinds thereof. Particularly, carbon black is preferable as the black coloring agent, and titanium oxide is preferable as the white coloring agent.

By mixing the coloring agents mentioned above, it is possible to produce a particle for display media having a suitable color.

Moreover, as the particle diameter of the particles for display media, it is preferred to set an average particle diameter d(0.5) to 1-20 μm and to use even particles. If the average particle diameter d(0.5) exceeds this range, the image clearness sometimes deteriorated, and, if the particle diameter is smaller than this range, an agglutination force between the particles becomes too large and the movement of the particles is prevented.

Further, it is preferred that particle diameter distribution Span of the particles for display media, which is defined by the following formula, is less than 5 preferably less than 3:

$$\text{Span}=(d(0.9)-d(0.1))/d(0.5);$$

(here, d(0.5) means a value of the particle diameter expressed by μm wherein an amount of the particles having the particle diameter larger than or smaller than this value is 50%, d(0.1) means a value of the particle diameter expressed by μm wherein an amount of the particles having the particle diameter smaller than this value is 10%, and d(0.9) means a value of the particle diameter expressed by μm wherein an amount of the particles having the particle diameter smaller than this value is 90%).

If the particle diameter distribution Span is set to not more than 5, the particle diameter becomes even and it is possible to perform an even particle movement.

Furthermore, as a correlation between the particles for display media, it is preferred to set a ratio of d(0.5) of the particles having smallest diameter with respect to d(0.5) of the particles having largest diameter to not more than 50 preferably not more than 10. The particles having different charge characteristics with each other are moved reversely, even if the particle diameter distribution Span is made smaller. Therefore, it is preferred that the particle sizes of the particles are made to be even with each other, and same amounts of the particles are easily moved in a reverse direction, and thus that is this range.

Here, the particle diameter distribution and the particle diameter mentioned above can be measured by means of a laser diffraction/scattering method. When a laser light is incident upon the particles to be measured, a light intensity distribution pattern due to a diffraction/scattering light occurs spatially. This light intensity distribution pattern corresponds to the particle diameter, and thus it is possible to measure the particle diameter and the particle diameter distribution.

In the present invention, it is defined that the particle diameter and the particle diameter distribution are obtained by a volume standard distribution. Specifically, the particle diameter and the particle diameter distribution can be measured by means of a measuring apparatus Mastersizer 2000 (Malvern Instruments Ltd.) wherein the particles setting in a nitrogen gas flow are calculated by an installed analysis software (which is based on a volume standard distribution due to Mie's theory).

A charge amount of the display media properly depends upon the measuring condition. However, it is understood that the charge amount of the display media used for the display media in the information display panel substantially depends upon an initial charge amount, a contact with respect to the partition wall, a contact with respect to the substrate, a charge decay due to an elapsed time, and specifically a saturation value of the particles for the display media during a charge behavior is a main factor.

After various investigations of the inventors, it is fond that an adequate range of the charged values of the particles for the display media can be estimated by performing a blow-off method utilizing the same carrier particles so as to measure the charge amount of the particles for the display media.

Further, in the dry-type information display panel in which the display media constituted by the particles for display media are driven in a gas space, it is important to control a gas in a gap surrounding the display media between the substrates, and a suitable gas control contributes an improvement of display stability. Specifically, it is important to control a humidity of the gas in the gap to not more than 60% RH at 25° C., preferably not more than 50% RH.

The above gap space means a gas portion surrounding the display media obtained by substituting the electrodes 5, 6 (in the case of arranging electrode inside of substrate), an occupied portion of the display media 3 (particles or liquid powders), an occupied portion of the partition walls 4 and a seal portion of the device from the space between the substrate 1 and the substrate 2 for example in FIGS. 1a, 1b, FIG. 2 and FIGS. 3a, 3b.

A kind of the gas in the gap is not limited if it has the humidity mentioned above, but it is preferred to use dry air, dry nitrogen gas, dry argon gas, dry helium gas, dry carbon dioxide gas, dry methane gas and so on. It is necessary to seal this gas in the information display panel so as to maintain the humidity mentioned above. For example, it is important to perform the operations of filling the display media and assembling the substrate under an atmosphere having a predetermined humidity and to apply a seal member and a seal method for preventing a humidity inclusion from outside of the device.

In the information display panel according to the invention, an interval between the substrates is not restricted if the display media can be moved and a contrast can be maintained, and it is adjusted normally to 10-500 μm, preferably 10-200 μm.

Moreover, it is preferred to control a volume occupied rate of the display media in a space between the opposed substrates to 5-70%, more preferably 5-60%. If the volume occupied rate of the display media exceeds 70%, the display media become difficult to move, and if it is less than 5%, a sufficient contrast cannot be obtained and a clear image display is not performed.

EXAMPLES

Hereinafter, the present invention will be explained further specifically with reference to the examples according to the invention and the comparative examples, but the present invention is not limited to the following examples.

<Experimental Examples of the Information Display Panel>

(As to a Relation Between the Rear Substrate and the Electrode)

Figure 9:
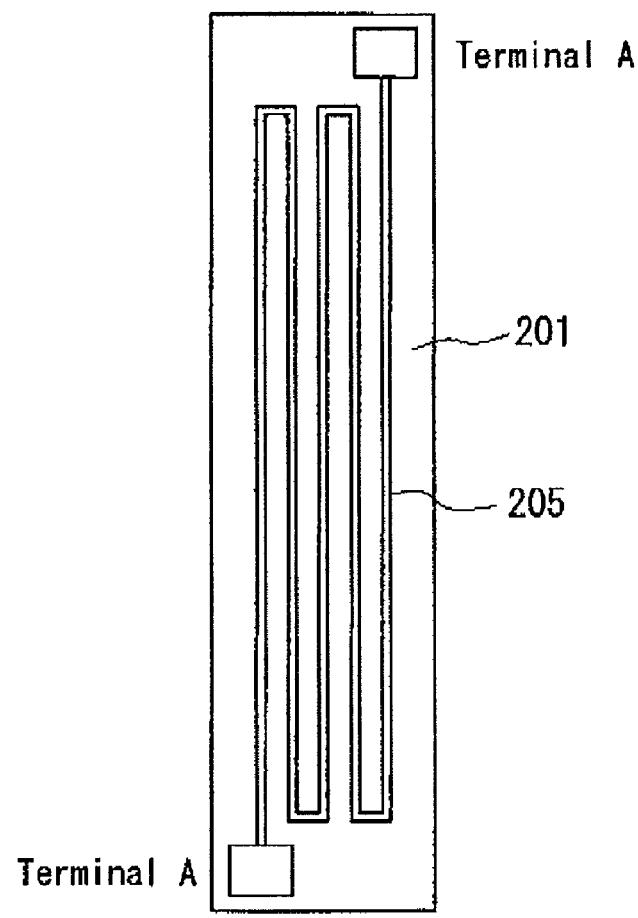
FIG. 9 is a schematic view illustrating a shape of a sample used in the embodiment of the invention.
Figure 10:
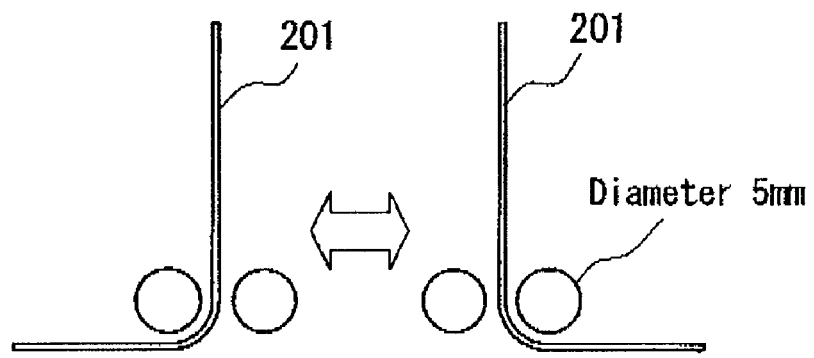
FIG. 10 is a schematic view explaining one embodiment of the bending test used inn the embodiment of the invention.

An example 1 in which an electrode 205 was formed by vapor-depositing aluminum (Al) on a rear substrate 201 made of PET, an example 2 in which the electrode 205 was formed by sputtering aluminum (Al) on the rear substrate 201 made of PET, and a comparative example 1 in which the electrode 205 was formed by a patterning process in such a manner that ITO was formed on the rear substrate 201 made of PET by means of a photolithograph method, were prepared. In respective examples, a thickness of the rear substrate was set to 100 μm and a thickness of the electrode was set to 0.06 μm. Actually, as shown in FIG. 9, the electrode having a predetermined pattern was formed on the rear substrate cut into a dimension of 1 cm×10 cm. Then, 90 degree bending test was performed with a curvature radius of 5 mm by means of the apparatus shown in FIG. 10, and an electrode resistance at an initial state, after 10 times bending, and after 100 times bending were measured. The measurement of the electrode resistance was performed under a condition such that DC voltage of 1 V was applied between a terminal A and a terminal B arranged at both ends of the electrode on the rear substrate. In the case that an electrode resistance value at an initial state was assumed to be 1, a variation of the electrode resistance value was shown in the following Table 1.

TABLE 1

| Number of bending test | | Initial | 10 times | 100 times |
|---|---|---|---|---|
| Example 1 | PET substrate + Al electrode | 1 | 1 | 1 |
| Example 2 | PEN substrate + Al electrode | 1 | 1 | 1 |
| Comparative example 1 | PET substrate + ITO electrode | 1 | 5 | 1000 |

From the results shown in Table 1, it is understood that, the electrode resistance value is not varied after 90 degree bending test in the examples 1 and 2, but the resistance value is varied largely due to a gradual cut-off of the electrode after 90 degree bending test in the comparative example 1, so that the examples 1 and 2 have a flexibility required in the invention.

(As to a Thickness of the Electrode)

A glass transparent substrate (7 cm×7 cm square) with line ITO electrodes was prepared as the front substrate, and a rib having a height of 50 μm was formed on the substrate so as to form partition walls having a square shape and a grid-like arrangement. The rib formation on the front substrate was performed as follows. A dry-film photoresist NIT 250 produced by Nichigo-Morton Co., Ltd., which is a photosensitive film, was laminated on a glass with line ITO, and then exposure and development operations were performed thereto so as to form the desired partition walls having a line of 30 μm, a space of 320 μm and a pitch of 350 μm. As the rear substrate, the substrate, in which aluminum (Al) was vapor-deposited on PET substrate (7 cm×7 cm square) and patterned by means of a photolithograph method to form a line electrode having a thickness of 0.005 μm, 0.01 μm, 0.1 μm and 1.5 μm, as is the same as the ITO glass substrate, was prepared.

Then, the white and black display media having different charge characteristics were filled in the cell formed by the partition walls on the front substrate, and two substrates were laminated with adhesives by handling the rear substrate to manufacture the information display panel. The manufactured information display panels were connected respectively to a drive apparatus to display information by driving the display media, and the display state was observed to estimate the display quality. The results are shown in the following Table 2.

TABLE 2

|  | Example 11 | Example 12 | Example 13 | Example 14 | Example 15 |
|---|---|---|---|---|---|
| Electrode thickness (μm) | 0.01 | 0.1 | 1.0 | 1.5 | 0.005 |
| Wire breaking generation during handling | None | None | None | None | Generated |
| Particle plugging generation between electrodes | None | None | None | Generated | None |
| Display state (display quality) | Display media in all cells move, and display can be effected | Display media in all cells move, and display can be effected | Display media in all cells move, and display can be effected | Display media do not move in the cell generating particle plugging between electrodes | Display media do not move in the cell generating particle plugging between electrodes |
| Overall evaluation | Good | Good | Good | Slightly no good | No good |

From the results shown in Table 2, it is understood that, in the examples 11-13, since a thickness of the electrode was set to 0.01-1.0 μm, the excellent display quality as the information display panel can be obtained, but, in the example 14, since there are some cells in which the particles for display media are plugged between the electrodes and the display media do not move, the display quality is low. In addition, in the example 15, the display media do not move at a portion corresponding to the wire breaking generation, and thus the display quality is low as compared with the example 14. Accordingly, it is understood that it is preferred to control a thickness of the electrode to 0.01-1 μm.

<Experimental Examples of the Method of Manufacturing Information Display Panel>

A comparative example in which the chip mounting was performed by ACF according to the processes shown in FIGS. 6a-6c, and an example in which the chip mounting was performed by an ultrasonic wave according to the processes shown in FIGS. 7a-7d, were prepared. Here, in the comparative example, the connection using ACF was performed in such a manner that a condition at a temperature of 150° C. and under a pressure of 3 MPa was maintained for 10 seconds by using ACF: product of Hitachi Chemical Co., Ltd. Moreover, in the example, the connection using an ultrasonic wave was performed in such a manner that a condition at a room temperature and under a pressure of 3 MPa was maintained for 3 seconds by using an ultrasonic head.

In both cases, the substrate made of PET was used as the substrate, the electrode having a width of 75 μm (corresponding to the wiring on the rear substrate) was arranged by forming Al vapor deposition film on the PET substrate, and the electrode (corresponding to the terminal of the chip) arranged correspondingly to the electrode of the substrate on the chip having a width of 20 mm, to manufacture specimens according to the example and the comparative example. Then, the conducting and insulating test was performed to investigate a conducting state between the electrodes mentioned above and an insulating state of the other portion. The conducting and insulating test was performed as follows. That is, in the case of using the chip having a width of 20 mm, the conducting state between the electrodes and the insulating state of the other portion by varying a resolution L/S [μm/μm] (L: electrode width, S: electrode distance) at 300/200, 100/100, and 50/50. Then, the property was evaluated by a deviation between the substrate electrode and the chip electrode due to an elongation of the PET substrate, and the case, in which the property was wrong, was denoted by a symbol x, and the case, in which the property was good since no elongation of the PET substrate was detected, was denoted by a symbol ○. The results are shown in the following Table 3.

TABLE 3

|  |  | Compression bonding temperature | Test contents | Resolution L/S [μm/μm] in case of using 20 mm width chip | | |
|---|---|---|---|---|---|---|
|  |  |  |  | 300/200 | 100/100 | 50/50 |
| Comparative example | ACF connection | 150° C. × 10 seconds | Conducting | ○ | X | X |
|  |  |  | Insulating | ○ | X | X |
| Example | Ultrasonic wave connection | Room temperature | Conducting | ○ | ○ | ○ |
|  |  |  | Insulating | ○ | ○ | ○ |

From the results shown in Table 3, in the example in which the connection was performed by applying an ultrasonic wave and a pressure, since the compression bonding could be performed at room temperature, the PET substrate was not elongated, and thus both of the conducing property and the insulating property were good. In the comparative example in which the connection was performed by ACF, the PET substrate was elongated by a heating above 150° C., the conducting property and the insulating property were good at a low resolution, but the conducting property and the insulating property were not good at a high resolution. Accordingly, it is understood that the example according to the invention was superior to the comparative example.

INDUSTRIAL APPLICABILITY

The information display panel according to the invention is applicable to the display unit for mobile equipment such as notebook personal computers, portable information device called as PDA (Personal Digital Assistants), cellular phones, handy terminal and so on; to the electric paper for electric book, electric newspaper and so on; to the bulletin boards such as signboards, posters, blackboards (whiteboards) and so on; to the image display unit for electric calculator, home electric application products, auto supplies and so on; to the card display unit for point card, IC card and so on; and to the display unit for electric advertisement, information board, electric POP (Point Of Presence, Point Of Purchase advertising), electric price tag, electric shelf tag, electric musical score, RF-ID device and so on, and further to the display unit for an electric device such as POS terminal, car-navigation device, clock and so on.

As to a driving method of the information display panel according to the invention, use is made of a display panel of simple matrix driving type and a display panel of static driving type, in which no switching element is used, or, a display panel of active matrix driving type, in which three-terminal switching element such as thin-film transistor (TFT) or two-terminal switching element such as thin-film diode (TFD).

The invention claimed is:

1. A method of manufacturing an information display panel in which display media are sealed between a transparent front substrate and a rear substrate, and, in which the display media, to which an electrostatic field is applied from electrodes arranged respectively to the front substrate and the rear substrate, are made to move so as to display information, wherein the rear substrate is constituted by a flexible material, and a metal electrode is formed on the rear substrate by a patterning process using a vapor deposition and a sputtering or a metal electrode is formed on the rear substrate by effecting a patterning process to a metal film formed by a vapor deposition or a sputtering; and wherein a chip of an information display driver is directly mounted on the rear substrate by applying an ultrasonic wave and a pressure to the chip to directly connect the chip to a wiring extended from the metal electrode.

2. The method of manufacturing the information display panel according to claim 1, wherein: the rear substrate is constituted by the flexible material; the metal electrode and the wiring extended from the metal electrode are arranged on the rear substrate by patterning a metal material by means of a vapor deposition or a sputtering or by forming a metal film by vapor-depositing or sputtering a metal material and patterning the metal film; and an ultrasonic wave and a pressure are applied under a condition such that a terminal of the chip is contacted to the wiring extended from the metal electrode so as to mount the chip.

3. The method of manufacturing the information display panel according to claim 1, wherein a wiring for connecting the chip and the information display driver is arranged on the rear substrate, together with the metal electrode and the wiring extended from the metal electrode, by patterning a metal material by means of a vapor deposition or a sputtering or by forming a metal film by vapor-depositing or sputtering a metal material and patterning the metal film, and an ultrasonic wave and a pressure are applied under a condition such that a terminal of the chip is in respective contact with wiring extended from the metal electrode and the wiring for connecting the chip and the information display driver so as to mount the chip.

4. The method of manufacturing the information display panel according to claim 1, wherein a thickness of the wiring for connecting the metal electrode, the wiring extended from the metal electrode and the chip and the information display driver is in a range of 0.01-1 μm.

5. The method of manufacturing the information display panel according to claim 1, wherein a thickness of all the wirings for connecting the metal electrode, the wiring extended from the metal electrode, the chip and the information display driver is the same.

6. The method of manufacturing the information display panel according to claim 1, wherein a material of the wiring for connecting the metal electrode, the wiring extended from the metal electrode, the chip and the information display driver is aluminum.

7. The method of manufacturing the information display panel according to claim 1, wherein the flexible material constituting the rear substrate is a resin.

8. The method of manufacturing the information display panel according to claim 7, wherein the resin is PET (Polyethylene Terephthalate) or PEN (Polyethylene Naphthalate).

* * * * *